US008697832B2

(12) United States Patent
Nanavati et al.

(10) Patent No.: US 8,697,832 B2
(45) Date of Patent: Apr. 15, 2014

(54) METHOD FOR PRODUCING LACTIC ACID POLYMERS OF HIGH CRYSTALLINITY AND MOLECULAR WEIGHT

(75) Inventors: Hemant Nanavati, Mumbai (IN); Vimal Katiyar, Mumbai (IN)

(73) Assignee: Indian Institute of Technology, Bombay, Mumbai (IN)

( * ) Notice: Subject to any disclaimer, the term of this patent is extended or adjusted under 35 U.S.C. 154(b) by 474 days.

(21) Appl. No.: 12/594,140

(22) PCT Filed: Apr. 4, 2008

(86) PCT No.: PCT/IN2008/000225
§ 371 (c)(1),
(2), (4) Date: Sep. 30, 2009

(87) PCT Pub. No.: WO2009/007989
PCT Pub. Date: Jan. 15, 2009

(65) Prior Publication Data
US 2010/0105859 A1    Apr. 29, 2010

(30) Foreign Application Priority Data
Apr. 4, 2007    (IN) .......................... 678/MUM/2007

(51) Int. Cl.
*C08G 63/08* (2006.01)
(52) U.S. Cl.
USPC ........... 528/354; 525/408; 525/415; 525/450; 528/275; 528/281; 528/282; 528/357; 528/361
(58) Field of Classification Search
USPC ........... 525/408, 415, 450; 528/35, 275, 281, 528/282, 354, 361
See application file for complete search history.

(56) References Cited

U.S. PATENT DOCUMENTS 5,508,378 A * 4/1996 Ohara et al. ................... 528/354
2004/0006199 A1 * 1/2004 Newman et al. .............. 528/354

FOREIGN PATENT DOCUMENTS

JP          03-014829     * 1/1991

OTHER PUBLICATIONS

Katiyar, et al., "Solid State Polymerization of Poly(L-Lactide): Multiple-Fold Increase in Molecular Weight via an Efficient Catalyst System", Polymer Engineering and Science, p. 2078-2084, 2011.
International Search Report dated Feb. 4, 2009 for related International Application No. PCT/IN2008/000225.
Written Opinion dated Feb. 4, 2009 for related International Application No. PCT/IN2008/000225.
Shinno, et al., "Solid-State Postpolymerization of L-Lactide Promoted by Crystallization of Product Polymer: An Effective Method for Reduction of Remaining Monomer", Macromolecules 30 6438-6444, 1997.
Moon, et al., "Melt/Solid Polycondensation of L-Lactic Acid: An Alternative Route to Poly (L—Lactic Acid) With High Molecular Weight", Polymer Communication, 42 (2001) 5059-5062, 2001.

* cited by examiner

*Primary Examiner* — Gregory Listvoyb
(74) *Attorney, Agent, or Firm* — Klein, O'Neill & Singh, LLP

(57) ABSTRACT

The invention relates to a process for preparing lactic acid polymers of highly crystallinity and molecular weight, the process comprising melt polymerization of a lactide to form prepolymers having active end groups followed by solid state polymerization. The polymerization is carried out in the presence of a catalyst complex comprising a lactide, an organic metal-oxo compound and a lactic acid oligomer. The residual lactide after the melt polymerization is removed by heating the reaction mixture in the temperature range of 98° C. to a temperature less than the melting point of the prepolymer. The metal to oligomer ratio in the catalyst complex is in the range of 0.1 to 10, preferably in the range of 0.5 to 5, more preferably in the range of 0.8 to 1.5.

10 Claims, No Drawings

METHOD FOR PRODUCING LACTIC ACID POLYMERS OF HIGH CRYSTALLINITY AND MOLECULAR WEIGHT

FIELD OF INVENTION

The present invention relates to a method for preparing lactic acid polymers having high crystallinity and molecular weight in the presence of a catalyst system comprising an organic metal-oxo compound and a lactic acid oligomer, the process comprising melt polymerization of a lactide followed by solid state polymerization The invention also relates to a catalyst system for preparing lactic acid polymers having high crystallinity and molecular weight, the catalyst system comprising a lactide, an organic metal-oxo compound and a lactic acid oligomer

BACKGROUND

Polylactic acid is a biodegradable polymer with a wide range of applications. It is used in textiles, for packaging purposes, in medical applications, including surgical sutures, sustained-release capsules and drug delivery systems and in reinforcing materials for bone fractures. It is also widely processed into monoaxially and biaxially stretched films, fibers and extrusion products. Molecular weight and crystallinity of the polylactic acid polymers are significant determinants of the quality of the products formed from it. The mechanical properties of polymers are strongly dependent on the molecular weight and the crystallinity. For low molecular weight polymers, the tensile strength is negligible, and increases to relatively useful values, with increasing molecular weight and ultimately reaches as asymptotic value. Hence, polymer with low molecular weight cannot be meaningfully processed via processes such as fiber spinning and film processing. Crystallinity of poly lactic acid is an important parameter for increasing its shelf life. Highly crystalline poly lactic acids possess the lowest gas diffusivity, and so, it hinders the gas molecule from penetrating into the polymer bulk. Water vapour from the atmosphere is one such gaseous species hindered from diffusing into the polymer, consequently reducing the polymer degradation, because even very small moisture content can cause hydrolytic degradation of the polymer chains. Gas and water barrier properties are also very essential for packaging applications.

U.S. Pat. No. 5,508,378 describes a method of producing high molecular weight polylactic acid in a two step process comprising (a) melt polymerization of a lactide to obtain polylactic acid and (b) solid state polymerization of the polylactic acid, obtained in step (a) by heating at a temperature lower than the melting point of the final polymer to obtain high molecular weight polylactic acid (with average molecular weight ranging between 70,000 to 430,000 Da). In this process, residual lactides present in 5 to 56.6% by weight of the melt polymerization step participate in further polymerization in the solid state for up to 60 hours in step (b), resulting in an increase in molecular weight by 0.93 to 2.4 times.

Shinno et al. (K. Shinno, M. Miyamoto and Y Kimura Macromolecules, 30 (201) 6438-6444, 1997) disclose polymerization of L-lactide using 0.1 mol % of stannous 2-ethyl hexanoate as a catalyst. In a two-step method, melt polymerization of L-lactide is first performed at temperatures higher than the melting point of poly (L-lactide) and then postpolymerization is continued in the solid state at a temperature close to the crystallization temperature. As poly (L-lactide) crystallizes in the second stage (when the temperature is changed from 140 to 120° C.), the monomer consumption was found to reach 100%. It was observed that the molecular weight of the polymer, however, did not increase during the solid-state polymerization step.

Moon et al. (S I Moon, C Lee and Y Kimura, Polymer, 42, 5059-5062, 2001) disclose melt polymerisation of lactic acid followed by solid-state polymerization, for production of high molecular weight polylactic acid starting from lactic acid. The maximum molecular weight of 600000 Da was obtained by this process at an overall polymerization time of 32 hours. However, drastic decrease in molecular weight of the polymer has been observed after the saturation point.

The molecular weight increase in the conventional polymerization process is thus limited and even if the molecular weight increases, the time required to reach high molecular weights is high. Moreover, the crystallinity of the polymers formed has been observed to be limited, and therefore, the polymers undergo degradation easily. This could be associated with the inherent limitation of the mechanism of polymerization in which the lactide monomer units are added to the growing polymer chain.

DETAILED DESCRIPTION OF THE INVENTION

Accordingly, the present invention provides a process for preparing lactic acid polymers of highly crystallinity and molecular weight, the process comprising melt polymerization of a lactide to form prepolymers having active end groups followed by solid state polymerization wherein the polymerization is carried out in the presence of a catalyst system comprising a lactide, a metal octoate and a lactic acid oligomer, the residual lactide after the melt polymerization being removed by heating the reaction mixture in the temperature range of 98° C. to a temperature less than the melting point of the prepolymer. The introduction of active end groups in the prepolymer facilitates increase in molecular weight and crystallinity, presumably by prepolymer-prepolymer reactions during further polymerization in the solid state. The method of the present invention yields polylactic acid with molecular weight in the range of 100000 to around 200000 and crystallinity in the range of 50 to 98% and more preferably in the range of 70 to 98%.

The invention also provides a catalyst system for preparing polylactic acid polymers of high crystallinity and molecular weight, the catalyst system being a metal complex comprising a lactide, an organic metal-oxo compound and a lactic acid oligomer.

The method for producing polylactic acid of high crystallinity and molecular weight comprises two steps, namely the melt polymerization step and the solid state polymerization step. In the melt polymerization step, a lactide used as the main starting material is polymerized in the molten state via ring opening polymerization to yield a prepolymer, and in the solid state polymerization step the prepolymers react with each other due to the active end groups, in the solid phase, at a temperature lower than the melting point of the polylactic acid.

In the melt polymerization step of the process of present invention, the reaction is first carried out at relatively high temperatures without any decomposition or coloration of the prepolymer being formed. Thereafter, the polylactic acid is formed in desired shapes for instance, in granules. The reaction temperature for the melt polymerization is in the range of 100° C. to 200° C., preferably in the range of 140° to 180° C. and more preferably in the range of 145° C. to 165° C. The polymerization reaction is carried out by heating the reaction mixture comprising lactides, for 0.5 to 5 hours, using a catalyst in an amount ranging from 0.00001~10% by weight, more preferably from 0.001~2% by weight. The prepolymer obtained has an average molecular weight in the range of 2,000 to 50,000 and contains lactides in an amount of from 0.001 to 10% by weight. Before solid state polymerization, the polylactic acid prepolymer is cooled for 0.25 hours to 10 hours, preferably for 1 hour to 4 hours, to a temperature lower than the melting point of the polymer. Residual lactide is then removed by heating the reaction mixture under reduced pressure in the preferred range of 98° C. to below the melting point of the polymer. The molecular weight of the polylactic acid polymer is controlled by controlling the prepolymerization time, the polymerization temperature and the amount of catalyst added. The temperature of solid state polymerization is desirably set at a temperature lower than the melting point of the polymer. The reaction is preferably carried out at reduced pressure and at a temperature of 150° C., in a reactor. The solid state polymerization time is normally from 1 to 20 hours, preferably between 5 to 12 hours. In order to shorten the reaction time, the reaction temperature is raised with the progress of solid state polymerization. The melting point of the final polymer product increases with the solid state reaction temperature and can rise up to around 190° C. The small amount of lactide produced during solid state polymerization is removed by carrying out the solid state polymerization in presence of non-condensable gases or under reduced pressure. The polylactic acid formed during the solid state polymerization has a high degree of crystallinity, in the range of 50 to 98% and more preferably in the range of 70 to 98%.

In one embodiment of the invention, the lactide monomer is copolymerized with lactones, such as β-propiolactone, δ-valerolactone and ε-caprolactone glycolide.

In another embodiment, the polylactic acid prepolymer obtained by the melt polymerization step is formed into a desired shape, such as granular, film, fiber and pelletized forms, using a forming machine and further solid state polymerization is carried out in the solid state maintaining its shape.

The catalyst system of the present invention is prepared from (i) a lactide (ii) a lactic acid oligomer and (iii) a metal or a metal compound in an organic solvent. The mixture of the above constituents is dissolved in suitable solvents at a temperature less than the boiling point of the solvent or of the mixture of solvents. The reaction mixture is stirred for a period of 15 minutes to 24 hours, depending on the metal-oxo organic compound prepared. After formation of the catalyst complex, the solvent is removed by evaporation or a filtration process, with or without vacuum. The metal to oligomer ratio in the complex is in the range of 0.1 to 10, preferably in the range of 0.5 to 5 and more preferably in the range of 0.8 to 1.5.

The metals used for the formation of the complex are selected from groups II, III, IV or V of the periodic table. Alternately, oxides of these metals or salts of these metals are also used. The metals/metallic compounds include zinc powder, tin powder, aluminum and other metals; tin oxide, zinc oxide, aluminum oxide, magnesium oxide, titanium oxide, and other metal oxides; stannous chloride, stannic chloride, stannous bromide, antimony fluoride, zinc chloride, magnesium chloride, aluminum chloride and other metal halides; tin lactate, zinc lactate, tin octanoate, and other metal organic carboxylates; titanium isopropoxide, aluminium isopropoxide and other metal alkoxides of other metals having at least one terminal hydroxyl group.

Lactic acid oligomers for the preparation of the catalyst system are formed from lactic acid. The oligomerization reaction takes place when a linear or a branched alkoxy or/and hydroxyl group leaves from one end of the lactic acid and/or lactate molecule during the polymerization reaction or when polymer chain grows and a hydrogen is cleaved from the hydroxyl group at the opposite end of (i) another lactate molecule, (ii) or a lactic acid molecule or (iii) a growing polymer chain. Thus, a condensation reaction by-product of the formula ROH is formed, wherein R is H or a $C_1$-$C_4$ group which is either linear or branched.

Organic solvents used in the preparation of the catalyst complex include hydrocarbon solvents such as benzene, toluene, xylene and mesitylene; halogenated hydrocarbon solvents such as chlorobenzene, bromobenzene, dichlorobenzene, halogenated solvents such as chloroform, dichloro methane; ether solvents such as tetrahydrofuran, dibutyl ether 3-methoxy toluene. These solvents are used either individually or as a mixture.

The lactides used for the process of the present invention is selected from a group consisting a D-, L-, or DL-isomer, or a mixture of D- and L-isomers. Further, the lactide monomers are optionally copolymerized with lactones, such as β-propiolactone, δ-valerolactone and ε-caprolactone glycolide The catalysts used for the polymerization process are added in one or more separate portions during the polymerization process. The various components of the catalyst complex of the present invention are added either individually or added in the form of the complex of the lactide, metal octoate and the lactic acid oligomer. Catalysts are used in an amount of 0.00001 to 10% by weight, more preferably in an amount of 0.001 to 2% by weight.

In the examples that follow, molecular weight determinations were carried out by a Waters GPC (Waters 2414 RI Detector) with PL-gel, 5μ Mixed-D (2×300 mm) Column, with polystyrene standards in chloroform, covering a molecular weight range of 160 to $4 \times 10^5$. The melting temperature ($T_m$) and Crystallinity ($X_c$) of the prepolymer and the high molecular weight polylactic acid polymer were determined by a NETZSCH STA 409PC Luxx Differential Scanning Calorimeter in the temperature range, 20-300° C. Optical purity (% L-content) was measured using Jasco DPI-370 digital polarimeter, calibrated with 5% fructose solution of $[\alpha]_{589nm} = -89°$.

EXAMPLES

Example 1

Polymerization of L-lactide was carried out by the conventional polymerization route, using tin octoate as the catalyst, in two stages. Melt polymerization was carried out at 160° C. for 2 hours. The polymerization was carried out in vacuum-sealed glass ampoules. The glass ampoule was first charged with 2 grams of dried L-lactide and subsequently, 140 μl of 0.1 M stannous octoate in toluene was added, keeping the L-lactide to catalyst molar ratio of 1000. The ampoule was sealed under high vacuum and immersed in an oil bath. After completion of polymerization, the glass ampoule was removed and subsequently, the molten reactive polymer mixture was cooled and thereafter samples were removed for analysis. The obtained polylactic acid had an average molecular weight of 113200 and a crystallinity of 29.6%. Further the polymer so obtained was transferred into a reactor and the solid state polymerization was carried out at 150° C. for 10 hours. The molecular weight analysis by GPC revealed that the obtained polylactic acid had an average molecular weight of 108500 and a crystallinity of 45.4%.

Preparation of the Catalyst

Example 2

72 mg of dry L-lactide was taken in a 50 mg round bottomed flask with 10 ml toluene under a nitrogen atmosphere, and was stirred for 30 min. This solution was transferred into another round bottomed flask which already contained 200 mg of tin octanoate (manufactured by Sigma Aldrich). Subsequently, 500 mg lactic acid oligomer was added into the reaction mixture, which was further diluted with 10 ml toluene. The reaction mixture was stirred at room temperature for 5 hours. Toluene was finally removed from the reaction mixture under vacuum at room temperature. Dry tin octanoate-oligomer-lactide catalyst complex so formed was utilized for the ROP of L-lactide.

Example 3

346 mg of dry L-lactide was taken in a 100 mg round bottomed flask with 30 ml benzene under a nitrogen atmosphere and was stirred for 30 min. This solution was transferred into another round bottomed flask which already contained 81 mg of tin octanoate (manufactured by Sigma Aldrich). Subsequently, 1.606 g lactic acid oligomer with molecular weight of 1393 Dalton was added into the reaction mixture, which was further diluted with 20 ml benzene. The reaction mixture was stirred at room temperature for 5 hours. Benzene was finally removed from the reaction mixture under vacuum at room temperature. The tin octanoate-oligomer-lactide catalyst complex formed was utilized for the ring opening polymerization of L-lactide.

Example 4

Dry L-lactide was taken in a 100 mg round bottomed flask with 30 ml toluene under the nitrogen atmosphere and stirred for 30 min. This solution was transferred into another round bottomed flask which already contained aluminium isopropoxide (manufactured by Sigma Aldrich). Subsequently, 1.000 g lactic acid oligomer was added into the reaction mixture and further diluted with 20 ml toluene. The reaction mixture was stirred at room temperature for 5 hours. The lactide to aluminium ratio was maintained at 20. Toluene was finally removed from the reaction mixture under vacuum at room temperature. Dry aluminium isopropoxide-oligomer-lactide catalyst complex was utilized for the ROP of L-lactide.

Example 5

To a 3-necked tubular reactor, equipped with a condenser and receiver at the end, and with a mechanical stirrer having a screw-type impeller, was added 375 g of lactic acid (90% w/w solution in water). The solution was stirred at 30 rpm and heated to 150° C. by temperature controlled tubular heater for two hours under nitrogen flow. Thereafter, stirring and heating are continued and the pressure was gradually reduced by a vacuum pump over two hours. The molten reaction mixture was then allowed to cool to room temperature to give 300 g of lactic acid oligomer with weight average molecular weight of 522. 13 gm of this oligomer was taken into another 100 ml three necked tubular reactor and stirred with 5.22 g zinc powder having particle size of 200 mesh for 8 hours at 120 degree C. Thereafter, the reaction mixture was dissolved in hot water and the filtrate was recovered and further dried to yield a zinc oligomer catalyst.

Melt Polymerization

Example 6

2 g of L-lactide was placed in a tubular reactor. 30 mg of the catalyst complex prepared in example 2 was added into the reaction mixture and immersed in an oil bath to heat the mixture at a temperature of 160° C. under reduced pressure for 1 hour. The reaction time was measured after all L-lactides were melted and the set temperature was reached. The obtained polylactic acid had an average molecular weight of 26,000 and a crystallinity of 61%. The poly lactic acid prepolymer was further heated at 110° C. for 2 hours at 0.05 mm Hg to obtain lactide free poly lactic acid prepolymer.

Example 7

10 g of L-lactide was placed in a tubular reactor, 150 mg of catalyst complex prepared in Example 2 was added into the reaction mixture. The tubular reactor was immersed in an oil bath to heat the mixture at a temperature of 160° C. under reduced pressure for 1 hour. The reaction time was measured after all L-lactides were melted and the set temperature was reached. The obtained polylactic acid had an average molecular weight of 18,000 and a crystallinity of 58%. The polylactic acid prepolymer was further crystallized at 110° C. for 2 hours under a high vacuum of 0.05 mm Hg to obtain lactide-free poly lactic acid prepolymer.

Solid State Polymerization

Example 8

The polylactic acid prepolymer formed in Example 6 was converted into pellets of the size of rice grains. The polylactic acid prepolymer was transferred to a reactor and a solid state polymerization reaction was carried out at 150° C. for 5 hours. Neither melt adhesion nor coloration of the pellets, was observed. The molecular weight analysis by GPC revealed that the obtained polylactic acid had an average molecular weight of 100,000 and a crystallinity of 85%.

Example 9

The polylactic prepolymer acid formed in the Example 6 was converted into pellets of the size of a rice grain. The polylactic acid prepolymer was transferred to a reactor and a solid state polymerization reaction was carried out at 150° C. for 10 hours. Neither melt adhesion nor coloration of the pellets was observed. The molecular weight analysis by GPC revealed that the obtained polylactic acid had an average molecular weight of 228000 and a crystallinity of 98%.

Example 10

The polylactic acid prepolymer formed in the Example 7 was converted into pellets of the size of rice grains. The polylactic acid prepolymer was transferred to a reactor, and a solid state polymerization reaction was carried out at 150° C. for 10 hours. Neither melt adhesion nor coloration of the pellets was observed. The molecular weight analysis by GPC revealed that the obtained polylactic acid had an average molecular weight of 153000 and a crystallinity of 95%.

Example 11

Poly lactic acid fiber drawn manually by molten pre poly lactic acid formed in Example 7 was utilized for solid state polymerization reaction. The obtained fiber was transferred to a reactor, and the reaction was carried out at 150° C. for 10 hours. Neither melt adhesion nor coloration of the fiber was observed. The molecular weight analysis by GPC revealed that the obtained polylactic acid had an average molecular weight of 153000 with a polydespersity index of 1.8.

Example 12

The polylactic acid prepolymer formed in the Example 6 is converted into powder of a size not more than 1 mm, and the pulverized mixture is placed in a glass reactor. In presence of nitrogen gas at a flow rate of 2.5 liters per minute, solid state polymerization is carried out at 150° C. in the solid state for 12 hours. After the reaction is terminated, the polylactic acid has an average molecular weight of 112,000 without causing any melt adhesion of the pulverized mixture. Also, coloration does not take place in the product.

The properties of polylactic polymers prepared by the process of the present invention are compared with the properties of polylactic acid prepared by the conventional route in the following table.

TABLE 1

Comparison of Polymerisation processes

| Process | Conversion (%) | Molecular Weight, Mw (Da) | Melting point, $T_m$ (° C.) | Crystallinity (%) |
| --- | --- | --- | --- | --- |
| Example 1[†] | 100 | 108500 | 173.6 | 45.4 |
| Example 6[††] | 99 | 26000 | 171.6 | 61 |
| Example 7[††] | 98 | 18000 | 170.3 | 58 |
| Example 8 | 100 | 100000 | 181.7 | 85 |
| Example 9 | 100 | 228000 | 189.3 | 98 |
| Example 10 | 100 | 163000 | 185.2 | 95 |
| Example 11 | 100 | 153000 | 185.0 | 94 |

[†]Corresponds to polymerization by conventional route
[††]Corresponds to Melt polymerization steps It can be seen from the table (Table 1) that the polylactic acid polymers prepared by the process of the present invention have high molecular weight and have substantially higher crystallinity as compared to the polymers prepared by the conventional route. It can also be seen that polylactic acid of the present invention have higher melting point than polylactic acids obtained through the conventional route.

The above description is illustrative only and the present invention is defined by the claims which follow and their full range of equivalents.

The invention claimed is:

1. A process for preparing lactic acid polymers having high crystallinity and molecular weight, the process comprising melt polymerization of a lactide to form prepolymers having active end groups followed by solid state polymerization of the prepolymers, wherein the melt polymerization is carried out in the presence of a catalyst system comprising a lactide, an organic metal-oxo compound and a polycondensed pre-formed lactic acid oligomer, the metal to oligomer ratio in the catalyst system being in the range of 0.1 to 10, and wherein the residual lactide monomer left after the melt polymerization is removed by heating the reaction mixture under reduced pressure, in the temperature range of 98° C. to a temperature less than the melting point of the prepolymer, such that during the solid state polymerization, the prepolymers react with each other to yield lactic acid polymers whose molecular weight is 3 to 9 times higher than the molecular weight of the prepolymer.

2. The process as claimed in claim 1 wherein the process is carried out with a catalyst system comprising a lactide, an organic metal-oxo compound and a lactic acid oligomer, the organic metal-oxo compound comprising metals of group II, Group III or Group IV of the periodic table.

3. The process as claimed in claim 1 wherein the process is carried out with a catalyst system present in an amount of 0.00001 to 10% by weight, more preferably in an amount of 0.001 to 2% by weight.

4. The process as claimed in claim 1 wherein the lactide used in the process is a D-lactide, L-lactide, DL lactide or a mixture of D- and L-lactides.

5. The process as claimed in claim 1 wherein the lactide used in the process is copolymerized with lactones selected from the group consisting of β-propiolactone, δ-valerolactone and ε-caprolactone glycolide.

6. The process as claimed in claim 1, wherein the melt polymerization step yields an intermediate prepolymer.

7. The process as claimed in claim 1, wherein the lactic acid polymers produced have a crystallinity in the range of 70 to 98%.

8. The process as claimed in claim 1, wherein the organic metal-oxo compound comprises metals of Group II, Group III, or Group IV of the periodic table.

9. The process as claimed in claim 1, wherein the metal to oligomer ratio in the catalyst system is in the range of 0.5 to 5.

10. The process as claimed in claim 1, wherein the metal to oligomer ratio in the catalyst system is in the range of 0.8 to 1.5.

* * * * *